US012689411B2

(12) United States Patent
Krishnakumar et al.

(10) Patent No.: US 12,689,411 B2
(45) Date of Patent: Jul. 21, 2026

(54) WEARABLE DEVICE WITH CONDUCTIVE COIL FOR WIRELESS CHARGING AND COMMUNICATING

(71) Applicant: Shure Acquisition Holdings, Inc., Niles, IL (US)

(72) Inventors: Arjun Krishnakumar, Chicago, IL (US); Christopher Zachara, Williamsburg, VA (US)

(73) Assignee: Shure Acquisition Holdings, Inc., Niles, IL (US)

( * ) Notice: Subject to any disclaimer, the term of this patent is extended or adjusted under 35 U.S.C. 154(b) by 732 days.

(21) Appl. No.: 17/330,625

(22) Filed: May 26, 2021

(65) Prior Publication Data

US 2021/0376881 A1 Dec. 2, 2021

Related U.S. Application Data

(60) Provisional application No. 62/704,829, filed on May 29, 2020.

(51) Int. Cl.
*H04B 5/79* (2024.01)
*H02J 50/00* (2016.01)
(Continued)

(52) U.S. Cl.
CPC .............. *H04B 5/79* (2024.01); *H02J 50/001* (2020.01); *H02J 50/10* (2016.02); *H02J 50/80* (2016.02);
(Continued)

(58) Field of Classification Search
CPC ...... H04B 5/00; H04B 5/0037; H04B 5/0031; H04B 5/0006; H04B 5/0075;
(Continued)

(56) References Cited

U.S. PATENT DOCUMENTS

| | | | | | |
|---|---|---|---|---|---|
| 5,771,438 A | * | 6/1998 | Palermo | ................ | H04M 1/737 |
| | | | | | 455/11.1 |
| 5,855,261 A | * | 1/1999 | Odachi | ................... | H02J 50/10 |
| | | | | | 318/16 |

(Continued)

FOREIGN PATENT DOCUMENTS

| | | | | | |
|---|---|---|---|---|---|
| CN | 109640207 A | * | 4/2019 | ............. | H02J 50/80 |
| EP | 0952756 A2 | | 10/1999 | | |

(Continued)

OTHER PUBLICATIONS

ÂNear-Field Magnetic Induction for Wireless Audio and Data StreamingâJean-Daniel Wu et al, Future Electronics, Published online Jun. 2017, https://www.futureelectronics.com/resources/get-connected/2017-06/future-electronics-near-field-magnetic-induction (Year: 2016).*

(Continued)

*Primary Examiner* — John T Trischler
(74) *Attorney, Agent, or Firm* — Banner & Witcoff, Ltd.

(57) ABSTRACT

A wearable device, such as an earphone, may include a conductive coil which may be used in several modes, including a first mode for harvesting power for charging an internal battery, a second mode for communicating via near field communications (NFC), and a third mode for communicating via near field magnetic induction (NFMI). Additionally, the wearable device may include a controller, configured to adapt or configure the conductive coil for each of the operational modes.

16 Claims, 11 Drawing Sheets

(51) Int. Cl.

| | |
|---|---|
| *H02J 50/10* | (2016.01) |
| *H02J 50/80* | (2016.01) |
| *H04B 5/26* | (2024.01) |
| *H04B 5/45* | (2024.01) |
| *H04R 1/1025* | (2026.01) |
| *H02J 105/44* | (2026.01) |
| *H04B 5/43* | (2024.01) |

(52) U.S. Cl.
CPC ................ *H04B 5/26* (2024.01); *H04B 5/45*
(2024.01); *H04R 1/1025* (2013.01); *H02J*
*2105/44* (2026.01); *H04B 5/43* (2024.01);
*H04R 2420/07* (2013.01)

(58) Field of Classification Search
CPC .. H04B 5/0081; H04B 5/0087; H04B 5/0025;
H04B 5/0093; H04B 5/79; H02J 50/00;
H02J 50/001; H02J 50/10; H02J 50/80;
H02J 2310/22; H02J 50/05; H02J 50/12;
H02J 50/15; H02J 50/20; H02J 50/23;
H02J 50/27; H02J 50/30; H02J 50/40;
H02J 50/50; H02J 50/60; H02J 50/70;
H02J 50/90; H04R 1/1016; H04R 1/1025;
H04R 2420/07; H01F 2038/143; H01F
2038/146; H01F 38/14; H01F 38/143;
H01F 38/146; B60L 53/12; B60L 53/122;
B60L 53/124; B60L 53/126; B60L 53/34;
B60L 53/38; B60L 53/39; A61N 1/3787;
A61B 1/00029; A61M 2205/8243; A61M
60/873; B60C 23/0413
USPC ................................. 320/137, 108; 307/104
See application file for complete search history.

(56) References Cited

U.S. PATENT DOCUMENTS

| | | | | |
|---|---|---|---|---|
| 6,405,088 B1 * | 6/2002 | Merlin | ................. | H04B 5/0087 607/60 |
| 6,459,882 B1 * | 10/2002 | Palermo | ................. | H04B 1/385 455/11.1 |
| 7,254,366 B2 * | 8/2007 | Palermo | ................... | H04B 5/48 455/66.1 |
| 7,548,040 B2 * | 6/2009 | Lee | ...................... | H04R 1/1025 320/108 |
| 8,686,685 B2 * | 4/2014 | Moshfeghi | .............. | H02J 50/12 320/108 |
| 9,124,121 B2 * | 9/2015 | Ben-Shalom | ........ | H04B 5/0025 |
| 9,276,639 B2 * | 3/2016 | Terlizzi | ................ | H04B 5/0006 |
| 9,318,921 B2 * | 4/2016 | Abu-Qahouq | .......... | H02J 50/80 |
| 9,343,923 B2 * | 5/2016 | Joshi | ...................... | H02J 50/90 |
| 9,385,560 B2 * | 7/2016 | Taylor | .................... | G01D 11/00 |
| 9,402,120 B2 * | 7/2016 | Lindén | .................... | H04R 1/10 |
| 9,525,936 B1 * | 12/2016 | Dong | ..................... | H04B 1/385 |
| 9,583,256 B2 * | 2/2017 | Lapetina | ................. | H01F 27/36 |
| 9,607,757 B2 * | 3/2017 | Hirobe | ............... | H01Q 1/2208 |
| 9,608,472 B2 * | 3/2017 | Moshfeghi | .............. | H02J 50/20 |
| 9,634,515 B2 * | 4/2017 | Hirobe | .................... | H02J 50/20 |
| 9,711,978 B2 * | 7/2017 | Manova-Elssibony | ..................... H02J 50/90 |
| 9,762,081 B2 * | 9/2017 | Manova-Elssibony | ..................... H04B 7/0682 |
| 9,762,083 B2 * | 9/2017 | Nam | ....................... | H01F 38/14 |
| 9,769,558 B2 * | 9/2017 | Chandramohan | ...... | H04R 1/345 |
| 9,793,758 B2 * | 10/2017 | Leabman | ................ | H02J 50/40 |
| 9,825,674 B1 * | 11/2017 | Leabman | ................. | H04B 5/79 |
| 9,847,670 B2 * | 12/2017 | Moshfeghi | .......... | H02J 7/00302 |
| 9,853,692 B1 * | 12/2017 | Bell | ..................... | H02J 50/001 |
| 9,854,344 B2 * | 12/2017 | Cheney | ............... | H04R 1/1058 |
| 9,866,282 B2 * | 1/2018 | Hirsch | ................... | H04W 4/80 |
| 9,866,945 B2 * | 1/2018 | McAuliffe | ............ | H01Q 1/273 |
| 9,876,536 B1 * | 1/2018 | Bell | ...................... | H02J 50/00 |

| | | | | |
|---|---|---|---|---|
| 9,887,739 B2 * | 2/2018 | Leabman | ............ | H02J 7/00045 |
| 9,900,057 B2 * | 2/2018 | Leabman | ............... | H02J 50/20 |
| 9,906,851 B2 * | 2/2018 | Schrems | ............... | G06F 1/1626 |
| 9,912,166 B2 * | 3/2018 | Baarman | ........... | H02J 7/00308 |
| 9,923,386 B1 * | 3/2018 | Leabman | ............. | H02J 50/402 |
| 9,941,048 B2 * | 4/2018 | Hirobe | ................... | H01Q 21/28 |
| 9,941,754 B2 * | 4/2018 | Leabman | ................. | H02J 50/90 |
| 9,941,937 B1 * | 4/2018 | Kerselaers | ............. | H01Q 7/08 |
| 9,949,015 B1 * | 4/2018 | Minoo | ................ | H04R 1/1091 |
| 9,961,431 B2 * | 5/2018 | McPeak | .............. | H04R 1/1016 |
| 9,961,433 B2 * | 5/2018 | Chawan | .............. | H01R 13/521 |
| 9,967,644 B2 * | 5/2018 | Chawan | ................ | A45C 11/24 |
| 9,967,648 B2 * | 5/2018 | Panecki | ............. | H04R 1/1025 |
| 9,967,649 B2 * | 5/2018 | Chandramohan | .... | H04R 1/1025 |
| 9,967,650 B2 * | 5/2018 | Chawan | ................ | A45C 13/02 |
| 9,973,840 B2 * | 5/2018 | Wagman | ................. | H04R 1/02 |
| 9,973,845 B2 * | 5/2018 | Chawan | .............. | H04R 1/1016 |
| 9,991,751 B2 * | 6/2018 | Taghivand | ............. | H02J 50/70 |
| 10,003,880 B2 * | 6/2018 | Wagman | ................. | H04R 1/02 |
| 10,003,881 B2 * | 6/2018 | Cousins | ............... | A45C 11/24 |
| 10,009,678 B2 * | 6/2018 | Panecki | ............... | B65D 43/16 |
| 10,014,726 B2 * | 7/2018 | Moshfeghi | ............ | H02J 50/90 |
| 10,020,683 B2 * | 7/2018 | Carobolante | ........... | H04B 5/79 |
| 10,044,231 B1 * | 8/2018 | Moshfeghi | .......... | H04B 1/3838 |
| 10,057,744 B2 * | 8/2018 | Keller | .................. | H04B 5/72 |
| 10,085,083 B2 * | 9/2018 | Minoo | ............... | H04R 1/1025 |
| 10,097,913 B2 * | 10/2018 | Zörkendörfer | ....... | H04B 1/3888 |
| 10,182,282 B2 * | 1/2019 | McPeak | ............... | H02J 7/0044 |
| 10,204,734 B2 * | 2/2019 | Hirobe | .................. | H01Q 1/243 |
| 10,206,474 B2 * | 2/2019 | Brzezinski | ........... | H02J 50/402 |
| 10,211,649 B2 * | 2/2019 | Richter | ................ | H02J 7/0013 |
| 10,212,506 B2 * | 2/2019 | Panecki | .............. | H04R 1/2826 |
| 10,225,637 B2 * | 3/2019 | Panecki | .................. | H04B 5/79 |
| 10,225,716 B2 * | 3/2019 | Terlizzi | .................. | H04B 5/72 |
| 10,237,642 B2 * | 3/2019 | Cheney | .............. | H04R 1/1058 |
| 10,263,474 B2 * | 4/2019 | Moshfeghi | ............ | H02J 50/90 |
| 10,284,942 B2 * | 5/2019 | McAuliffe | .............. | H01Q 9/42 |
| 10,291,294 B2 * | 5/2019 | Leabman | ............... | H02J 50/90 |
| 10,320,240 B2 * | 6/2019 | Moshfeghi | .......... | H02J 7/00302 |
| 10,347,973 B2 * | 7/2019 | Kerselaers | ........... | H01Q 21/30 |
| 10,355,531 B2 * | 7/2019 | Moshfeghi | ............. | H02J 50/12 |
| 10,356,537 B2 | 7/2019 | Niklaus et al. | | |
| 10,390,594 B2 * | 8/2019 | Brzezinski | ........... | H04R 1/1025 |
| 10,396,604 B2 * | 8/2019 | Bell | ......................... | H04B 5/72 |
| 10,397,682 B2 * | 8/2019 | Chawan | .............. | H04R 1/1041 |
| 10,397,683 B2 * | 8/2019 | LeBlanc | .................. | H04B 5/79 |
| 10,411,325 B2 * | 9/2019 | Tenno | ..................... | H01Q 7/06 |
| 10,424,828 B2 * | 9/2019 | Seong | ................... | H05K 9/0081 |
| 10,455,312 B1 * | 10/2019 | Chen | ...................... | H04R 3/04 |
| 10,491,271 B2 * | 11/2019 | Pifferi | ..................... | H04B 5/79 |
| 10,506,324 B2 * | 12/2019 | Minoo | ................. | H02J 7/0044 |
| 10,530,188 B2 * | 1/2020 | Baarman | .............. | H02J 50/001 |
| 10,546,686 B2 * | 1/2020 | Verschueren | ........... | H01F 38/14 |
| 10,587,943 B2 * | 3/2020 | Boesen | .............. | H04R 1/1041 |
| 10,616,750 B2 * | 4/2020 | Thoen | .................. | H04W 8/005 |
| 10,631,609 B2 * | 4/2020 | Brzezinski | ............. | A45C 11/24 |
| 10,681,446 B2 * | 6/2020 | Chawan | ................ | H01R 13/521 |
| 10,707,703 B2 * | 7/2020 | Noh | ...................... | H01F 38/14 |
| 10,756,575 B2 * | 8/2020 | Xin | ..................... | H02J 50/10 |
| 10,841,684 B2 * | 11/2020 | Gu | ...................... | H04R 1/1025 |
| 10,848,853 B2 * | 11/2020 | Leabman | ............... | H04B 1/385 |
| 10,880,630 B2 * | 12/2020 | Chawan | .............. | H04R 1/1075 |
| 10,904,652 B2 * | 1/2021 | Chawan | ................ | B65D 25/02 |
| 10,910,864 B2 * | 2/2021 | Kim | ....................... | H02J 50/12 |
| 10,938,246 B2 * | 3/2021 | Moshfeghi | .............. | H02J 50/12 |
| 10,958,310 B2 * | 3/2021 | Terlizzi | .................. | H02J 50/20 |
| 10,966,012 B2 * | 3/2021 | Lindén | ............... | H04R 1/1025 |
| 10,972,825 B2 * | 4/2021 | Larsen | ................. | H02J 50/40 |
| 10,992,185 B2 * | 4/2021 | Leabman | ................ | A61B 8/56 |
| 11,005,302 B1 * | 5/2021 | Rule | .................. | G06K 19/0708 |
| 11,025,080 B2 * | 6/2021 | Zeine | ................... | H02J 50/80 |
| 11,026,010 B2 * | 6/2021 | Chawan | .............. | H04R 1/2826 |
| 11,026,011 B2 * | 6/2021 | Chawan | ................ | H04R 1/02 |
| 11,033,087 B2 * | 6/2021 | Brzezinski | ............. | H02J 50/10 |
| 11,038,555 B2 * | 6/2021 | Biederman | ............ | H01Q 7/00 |
| 11,039,238 B2 * | 6/2021 | Schrems | ............. | H04R 1/1016 |
| 11,056,918 B2 * | 7/2021 | Maniktala | ............ | H01F 27/255 |
| 11,218,795 B2 * | 1/2022 | Leabman | ................. | H04B 7/14 |
| 11,295,187 B2 * | 4/2022 | Freitas | ................. | H02J 50/001 |

(56) References Cited

U.S. PATENT DOCUMENTS

| | | | | |
|---|---|---|---|---|
| 11,316,560 B1* | 4/2022 | Kerselaers | H02J 50/80 | |
| 11,329,515 B2* | 5/2022 | Rule | G07F 15/006 | |
| 11,418,069 B1* | 8/2022 | Luzinski | H02J 50/80 | |
| 11,418,235 B2* | 8/2022 | Gommé | H04B 5/73 | |
| 11,444,390 B2* | 9/2022 | Benbouhout | H04B 5/79 | |
| 11,476,712 B2* | 10/2022 | Peralta | H02J 50/80 | |
| 11,502,551 B2* | 11/2022 | Leabman | H02J 50/40 | |
| 11,503,458 B1* | 11/2022 | Elshafie | H02J 50/80 | |
| 11,523,206 B2* | 12/2022 | Lehnert | H02J 50/12 | |
| 11,527,912 B2* | 12/2022 | Alam | H04B 5/79 | |
| 11,533,082 B2* | 12/2022 | Terlizzi | H04W 12/06 | |
| 11,545,855 B2* | 1/2023 | Smith | H02J 50/10 | |
| 11,553,281 B2* | 1/2023 | Grinnip, III | H04R 5/033 | |
| 11,553,772 B2* | 1/2023 | Brzezinski | H02J 7/0013 | |
| 11,610,089 B2* | 3/2023 | Freitas | H02J 50/001 | |
| 11,616,532 B2* | 3/2023 | Gommé | H04B 5/77 | |
| | | | | 455/41.1 |
| 11,626,754 B2* | 4/2023 | Zeine | H02J 50/001 | |
| | | | | 320/108 |
| 11,664,684 B2* | 5/2023 | Rule | H04L 63/06 | |
| | | | | 726/6 |
| 11,672,078 B2* | 6/2023 | Zachara | H01Q 1/52 | |
| | | | | 381/74 |
| 11,677,151 B2* | 6/2023 | Kerselaers | H01Q 7/08 | |
| | | | | 343/702 |
| 11,678,165 B2* | 6/2023 | Meyer | H04W 4/80 | |
| | | | | 340/635 |
| 11,690,428 B2* | 7/2023 | Chawan | H04R 5/033 | |
| | | | | 381/380 |
| 11,722,177 B2* | 8/2023 | Leabman | H02J 50/402 | |
| | | | | 320/108 |
| 11,762,624 B2* | 9/2023 | van Erven | H04B 5/70 | |
| | | | | 381/74 |
| 11,764,622 B2* | 9/2023 | Luzinski | H02J 50/80 | |
| | | | | 307/149 |
| 11,765,519 B2* | 9/2023 | Grinnip, III | H04R 1/1066 | |
| | | | | 381/191 |
| 11,784,681 B2* | 10/2023 | Wobak | H04B 5/43 | |
| | | | | 455/41.1 |
| 11,824,373 B2* | 11/2023 | Peralta | H01F 27/2823 | |
| 11,831,173 B2* | 11/2023 | Peralta | H04B 5/79 | |
| 11,837,879 B2* | 12/2023 | Peralta | G01D 7/00 | |
| 11,838,714 B1* | 12/2023 | Sjoeroos | H02J 50/10 | |
| 11,862,984 B2* | 1/2024 | Alam | H02J 50/001 | |
| 11,870,511 B2* | 1/2024 | Verschueren | G06F 3/011 | |
| 11,877,220 B2* | 1/2024 | Meyer | G08B 5/00 | |
| 11,881,714 B2* | 1/2024 | Abotabl | H02J 50/20 | |
| 11,894,693 B2* | 2/2024 | Landis | H02J 50/001 | |
| 11,910,147 B2* | 2/2024 | Lehnert | H02J 7/0044 | |
| 11,944,172 B2* | 4/2024 | Chawan | H04B 1/3888 | |
| 11,951,220 B2* | 4/2024 | Persson | H04R 1/1025 | |
| 11,987,783 B2* | 5/2024 | Bhat | C12M 41/00 | |
| 12,027,880 B2* | 7/2024 | Yoon | H02J 50/27 | |
| 12,046,910 B2* | 7/2024 | Veysi | H02J 7/02 | |
| 12,046,916 B2* | 7/2024 | Rule | G06Q 20/3278 | |
| 12,100,982 B2* | 9/2024 | Kapolnek | H02J 50/10 | |
| 12,100,983 B2* | 9/2024 | Kapolnek | H02J 50/40 | |
| 12,425,758 B2* | 9/2025 | Lehnert | H04R 5/04 | |
| 12,438,400 B2* | 10/2025 | Yoon | H02J 7/007 | |
| 2003/0050011 A1* | 3/2003 | Palermo | H04B 5/00 | |
| | | | | 455/11.1 |
| 2005/0164636 A1* | 7/2005 | Palermo | H04M 1/6066 | |
| | | | | 379/55.1 |
| 2007/0032274 A1* | 2/2007 | Lee | H04R 1/1025 | |
| | | | | 455/575.2 |
| 2008/0081631 A1* | 4/2008 | Rofougaran | H01Q 1/38 | |
| | | | | 455/452.1 |
| 2010/0190436 A1* | 7/2010 | Cook | H04B 5/00 | |
| | | | | 455/41.1 |
| 2011/0115605 A1* | 5/2011 | Dimig | H02J 50/402 | |
| | | | | 340/5.61 |
| 2011/0156640 A1* | 6/2011 | Moshfeghi | H02J 50/12 | |
| | | | | 320/108 |

| | | | | |
|---|---|---|---|---|
| 2011/0217927 A1* | 9/2011 | Ben-Shalom | H02J 50/10 | |
| | | | | 455/41.1 |
| 2011/0218014 A1* | 9/2011 | Abu-Qahouq | H02J 50/20 | |
| | | | | 320/108 |
| 2012/0161721 A1* | 6/2012 | Neethimanickam | H02J 50/90 | |
| | | | | 320/167 |
| 2014/0011446 A1* | 1/2014 | Kangas | H04B 5/24 | |
| | | | | 455/552.1 |
| 2014/0055088 A1* | 2/2014 | Joshi | H02J 50/80 | |
| | | | | 320/108 |
| 2014/0168019 A1* | 6/2014 | Hirobe | H01F 38/14 | |
| | | | | 343/788 |
| 2014/0203758 A1* | 7/2014 | Moshfeghi | H04B 1/3838 | |
| | | | | 320/103 |
| 2014/0241555 A1* | 8/2014 | Terlizzi | H04B 5/0006 | |
| | | | | 320/108 |
| 2014/0375261 A1* | 12/2014 | Manova-Elssibony | | |
| | | | H02J 7/00034 | |
| | | | | 320/108 |
| 2015/0115727 A1* | 4/2015 | Carobolante | H04B 5/79 | |
| | | | | 307/104 |
| 2015/0128733 A1* | 5/2015 | Taylor | G01D 11/00 | |
| | | | | 73/865.8 |
| 2015/0171658 A1* | 6/2015 | Manova-Elssibony | | |
| | | | H04B 7/0682 | |
| | | | | 320/108 |
| 2015/0207333 A1* | 7/2015 | Baarman | H02J 50/60 | |
| | | | | 307/104 |
| 2015/0245126 A1* | 8/2015 | Shaffer | H04R 1/1025 | |
| | | | | 381/74 |
| 2015/0333562 A1* | 11/2015 | Nam | H02J 50/90 | |
| | | | | 320/108 |
| 2015/0340910 A1* | 11/2015 | Petras | H02J 50/40 | |
| | | | | 320/108 |
| 2015/0364938 A1* | 12/2015 | Lapetina | H01F 27/36 | |
| | | | | 320/114 |
| 2016/0072558 A1* | 3/2016 | Hirsch | H04B 5/0081 | |
| | | | | 455/41.1 |
| 2016/0073188 A1* | 3/2016 | Lindén | H04R 1/1025 | |
| | | | | 381/74 |
| 2016/0094064 A1* | 3/2016 | Richter | H02J 7/0048 | |
| | | | | 320/112 |
| 2016/0099611 A1* | 4/2016 | Leabman | H02J 50/80 | |
| | | | | 307/104 |
| 2016/0099756 A1* | 4/2016 | Leabman | H04B 5/0037 | |
| | | | | 307/104 |
| 2016/0099757 A1* | 4/2016 | Leabman | H02J 50/001 | |
| | | | | 307/104 |
| 2016/0134959 A1* | 5/2016 | Shaffer | H04R 1/1025 | |
| | | | | 381/74 |
| 2016/0218549 A1* | 7/2016 | Hirobe | H02J 7/00034 | |
| 2016/0254843 A1* | 9/2016 | Terlizzi | H02J 50/20 | |
| | | | | 455/41.2 |
| 2016/0352138 A1* | 12/2016 | Hirobe | H02J 50/10 | |
| 2016/0380471 A1* | 12/2016 | Moshfeghi | H04B 1/3838 | |
| | | | | 320/108 |
| 2016/0380472 A1* | 12/2016 | Moshfeghi | H02J 50/90 | |
| | | | | 320/108 |
| 2017/0070091 A9* | 3/2017 | Leabman | H02J 50/80 | |
| 2017/0077742 A1* | 3/2017 | Moshfeghi | H02J 50/20 | |
| 2017/0093079 A1* | 3/2017 | Wagman | H04R 1/345 | |
| 2017/0093453 A1* | 3/2017 | Panecki | H04R 1/1058 | |
| 2017/0093454 A1* | 3/2017 | Chawan | H04R 1/345 | |
| 2017/0094381 A1* | 3/2017 | LeBlanc | H04R 5/033 | |
| 2017/0094390 A1* | 3/2017 | Chawan | H04R 1/1075 | |
| 2017/0094391 A1* | 3/2017 | Panecki | H02J 7/0044 | |
| 2017/0094392 A1* | 3/2017 | Zörkendörfer | A45C 11/24 | |
| 2017/0094393 A1* | 3/2017 | Panecki | B65D 25/02 | |
| 2017/0094394 A1* | 3/2017 | McPeak | H04R 5/033 | |
| 2017/0094395 A1* | 3/2017 | McPeak | H04B 1/3888 | |
| 2017/0094396 A1* | 3/2017 | Chandramohan | A45C 11/00 | |
| 2017/0094397 A1* | 3/2017 | Wagman | H04R 1/1025 | |
| 2017/0094398 A1* | 3/2017 | Cousins | A45C 11/00 | |
| 2017/0094399 A1* | 3/2017 | Chandramohan | H04R 5/033 | |
| 2017/0125883 A1* | 5/2017 | Tenno | H01Q 7/06 | |
| 2017/0156022 A1* | 6/2017 | Keller | H04W 4/80 | |
| 2017/0170688 A1* | 6/2017 | Maniktala | H01F 38/14 | |

(56) References Cited

U.S. PATENT DOCUMENTS

| | | | | |
|---|---|---|---|---|
| 2017/0195770 A1* | 7/2017 | Cheney | | H04R 1/1016 |
| 2017/0201821 A1* | 7/2017 | McAuliffe | | H04R 1/1066 |
| 2017/0237469 A1* | 8/2017 | Taghivand | | H02J 50/12 |
| | | | | 455/41.1 |
| 2017/0238087 A1* | 8/2017 | Chawan | | A45C 11/00 |
| | | | | 381/380 |
| 2017/0245038 A1* | 8/2017 | Chawan | | H04R 1/1016 |
| 2017/0256990 A1* | 9/2017 | Maniktala | | H01F 27/24 |
| 2017/0263376 A1* | 9/2017 | Verschueren | | H01Q 7/08 |
| 2017/0264133 A1* | 9/2017 | Moshfeghi | | H04B 1/3838 |
| 2017/0264134 A1* | 9/2017 | Moshfeghi | | H02J 50/90 |
| 2017/0271909 A1* | 9/2017 | Moshfeghi | | H02J 50/80 |
| 2017/0339482 A1* | 11/2017 | Schrems | | H02J 50/10 |
| 2017/0347182 A1* | 11/2017 | Chawan | | H04R 1/1016 |
| 2018/0014104 A1* | 1/2018 | Boesen | | H04R 1/1016 |
| 2018/0027343 A1* | 1/2018 | Dobson | | H04R 25/556 |
| | | | | 381/322 |
| 2018/0064224 A1* | 3/2018 | Brzezinski | | A45C 13/02 |
| 2018/0091884 A1* | 3/2018 | Minoo | | H04R 1/1016 |
| 2018/0091887 A1* | 3/2018 | Minoo | | H04R 1/1025 |
| 2018/0103312 A1* | 4/2018 | McAuliffe | | H04R 1/1016 |
| 2018/0115816 A1* | 4/2018 | Panecki | | H02J 50/10 |
| 2018/0124494 A1* | 5/2018 | Cheney | | H04R 1/1058 |
| 2018/0174747 A1* | 6/2018 | Hirobe | | H02J 50/12 |
| 2018/0183274 A1* | 6/2018 | Auten | | H02J 50/27 |
| 2018/0183494 A1* | 6/2018 | Leabman | | H02J 50/80 |
| 2018/0212475 A1* | 7/2018 | Noh | | H01Q 1/22 |
| 2018/0226835 A1* | 8/2018 | Baarman | | H02J 50/60 |
| 2018/0226836 A1* | 8/2018 | Moshfeghi | | H02J 7/00302 |
| 2018/0233277 A1* | 8/2018 | Xin | | H01F 27/36 |
| 2018/0241116 A1* | 8/2018 | Kerselaers | | H04B 5/0031 |
| 2018/0287418 A1* | 10/2018 | Zeine | | H02J 50/80 |
| 2018/0323494 A1* | 11/2018 | Seong | | H01Q 1/24 |
| 2018/0337534 A1* | 11/2018 | Bell | | H02J 50/402 |
| 2018/0352406 A1* | 12/2018 | Keller | | H04B 5/24 |
| 2018/0367883 A1* | 12/2018 | Minoo | | H02J 7/0042 |
| 2018/0376235 A1* | 12/2018 | Leabman | | H04R 23/008 |
| 2019/0028149 A1* | 1/2019 | Pifferi | | H04B 5/26 |
| 2019/0058349 A1* | 2/2019 | Kim | | H01M 10/44 |
| 2019/0096000 A1* | 3/2019 | Boesen | | A61B 5/02433 |
| 2019/0110567 A1* | 4/2019 | Brzezinski | | A45C 13/02 |
| 2019/0122816 A1* | 4/2019 | Hirobe | | H01Q 21/28 |
| 2019/0158149 A1* | 5/2019 | Terlizzi | | H02J 50/10 |
| 2019/0174239 A1* | 6/2019 | Niklaus | | H04R 25/558 |
| 2019/0208396 A1* | 7/2019 | Thoen | | H04W 48/14 |
| 2019/0289381 A1* | 9/2019 | Chawan | | H04B 1/3888 |
| 2019/0289382 A1* | 9/2019 | Chawan | | H02J 50/10 |
| 2019/0289383 A1* | 9/2019 | Chawan | | B65D 25/02 |
| 2019/0296586 A1* | 9/2019 | Moshfeghi | | H02J 50/90 |
| 2019/0327550 A1* | 10/2019 | Lindén | | H04R 1/1016 |
| 2019/0335868 A1* | 11/2019 | Brzezinski | | A45C 13/02 |
| 2019/0349660 A1* | 11/2019 | Chen | | H04R 3/04 |
| 2019/0393928 A1* | 12/2019 | Leabman | | H02J 7/00034 |
| 2020/0044695 A1* | 2/2020 | Biederman | | H01Q 11/08 |
| 2020/0068286 A1* | 2/2020 | Schrems | | H04R 1/1016 |
| 2020/0071656 A1* | 3/2020 | Bhat | | C12M 43/08 |
| 2020/0185971 A1* | 6/2020 | Moshfeghi | | H04B 1/3838 |
| 2020/0221208 A1* | 7/2020 | Gu | | H04R 1/1025 |
| 2020/0221843 A1* | 7/2020 | Brzezinski | | H02J 50/10 |
| 2020/0252713 A1* | 8/2020 | Larsen | | H02J 50/12 |
| 2020/0275184 A1* | 8/2020 | Chawan | | H04R 1/1016 |
| 2020/0288229 A1* | 9/2020 | Chawan | | H04R 1/1058 |
| 2020/0293847 A1* | 9/2020 | Freitas | | G06K 19/0718 |
| 2020/0335883 A1* | 10/2020 | Benbouhout | | H01Q 9/42 |
| 2020/0353110 A1* | 11/2020 | Persson | | B08B 7/04 |
| 2021/0037306 A1* | 2/2021 | Lehnert | | H04R 1/1025 |
| 2021/0089265 A1* | 3/2021 | van Erven | | H04R 1/10 |
| 2021/0152912 A1* | 5/2021 | Chawan | | A45C 11/24 |
| 2021/0152922 A1* | 5/2021 | Leabman | | H04R 1/1066 |
| 2021/0184504 A1* | 6/2021 | Moshfeghi | | H02J 50/12 |
| 2021/0184505 A1* | 6/2021 | Moshfeghi | | H02J 7/00302 |
| 2021/0194543 A1* | 6/2021 | Terlizzi | | H04B 5/79 |
| 2021/0242723 A1* | 8/2021 | Zeine | | H02J 50/20 |
| 2021/0265870 A1* | 8/2021 | Veysi | | H02J 50/23 |
| 2021/0274273 A1* | 9/2021 | Chawan | | H04R 1/345 |
| 2021/0314028 A1* | 10/2021 | Wobak | | H04B 5/77 |
| 2021/0330050 A1* | 10/2021 | Brzezinski | | H02J 50/10 |
| 2021/0376881 A1* | 12/2021 | Krishnakumar | | H04R 1/1025 |
| 2021/0377672 A1* | 12/2021 | Grinnip, III | | H04R 5/033 |
| 2021/0377714 A1* | 12/2021 | Meyer | | G08B 21/182 |
| 2021/0392741 A1* | 12/2021 | Zachara | | H05K 1/0243 |
| 2022/0029464 A1* | 1/2022 | Smith | | H02J 50/50 |
| 2022/0045554 A1* | 2/2022 | Leabman | | H02J 50/80 |
| 2022/0069629 A1* | 3/2022 | Rule | | G07F 15/006 |
| 2022/0078562 A1* | 3/2022 | Dobson | | H01Q 1/2208 |
| 2022/0085504 A1* | 3/2022 | Kerselaers | | H04B 5/0037 |
| 2022/0131572 A1* | 4/2022 | Kerselaers | | H04B 5/79 |
| 2022/0149897 A1* | 5/2022 | Gommé | | H04B 5/0056 |
| 2022/0188587 A1* | 6/2022 | Freitas | | G06K 19/0723 |
| 2022/0239156 A1* | 7/2022 | Rule | | H02J 7/0068 |
| 2022/0239163 A1* | 7/2022 | Luzinski | | H02J 50/12 |
| 2022/0247215 A1* | 8/2022 | Peralta | | H02J 50/12 |
| 2022/0247216 A1* | 8/2022 | Alam | | H02J 50/80 |
| 2022/0302960 A1* | 9/2022 | Gommé | | H04B 5/0031 |
| 2022/0302962 A1* | 9/2022 | Verschueren | | G06F 3/011 |
| 2022/0329110 A1* | 10/2022 | Yoon | | H02J 50/005 |
| 2022/0352621 A1* | 11/2022 | Zachara | | H01Q 9/42 |
| 2022/0352751 A1* | 11/2022 | Elshafie | | H02J 50/23 |
| 2022/0353670 A1* | 11/2022 | Elshafie | | H04W 52/18 |
| 2022/0376555 A1* | 11/2022 | Landis | | H04W 72/23 |
| 2022/0393722 A1* | 12/2022 | Gommé | | H04B 5/0031 |
| 2023/0076836 A1* | 3/2023 | Luzinski | | H04B 5/79 |
| 2023/0108763 A1* | 4/2023 | Peralta | | H02J 50/12 |
| | | | | 307/104 |
| 2023/0128704 A1* | 4/2023 | Grinnip, III | | H04R 5/033 |
| | | | | 381/191 |
| 2023/0132565 A1* | 5/2023 | Yoon | | H02J 50/502 |
| | | | | 307/149 |
| 2023/0134561 A1* | 5/2023 | Yoon | | H02J 50/005 |
| | | | | 307/149 |
| 2023/0135491 A1* | 5/2023 | Alam | | H02J 50/001 |
| | | | | 307/149 |
| 2023/0135513 A1* | 5/2023 | Kapolnek | | H02J 7/0044 |
| | | | | 320/108 |
| 2023/0137061 A1* | 5/2023 | Peralta | | H02J 50/23 |
| | | | | 307/149 |
| 2023/0138071 A1* | 5/2023 | Peralta | | H02J 50/50 |
| | | | | 307/104 |
| 2023/0139532 A1* | 5/2023 | Kapolnek | | H02J 7/0013 |
| | | | | 320/108 |
| 2023/0187969 A1* | 6/2023 | Zeine | | H02J 50/80 |
| | | | | 320/108 |
| 2023/0208198 A1* | 6/2023 | Leabman | | H05B 3/342 |
| | | | | 307/104 |
| 2023/0216341 A1* | 7/2023 | Alam | | H01Q 1/36 |
| | | | | 307/104 |
| 2023/0224622 A1* | 7/2023 | Lehnert | | H04R 1/1025 |
| | | | | 381/74 |
| 2023/0253831 A1* | 8/2023 | Rule | | H02J 7/0068 |
| | | | | 726/6 |
| 2023/0262878 A1* | 8/2023 | Zachara | | H04R 1/1033 |
| | | | | 381/74 |
| 2023/0268771 A1* | 8/2023 | Shin | | H02J 50/80 |
| | | | | 320/108 |
| 2023/0275457 A1* | 8/2023 | Abotabl | | H02J 50/001 |
| | | | | 307/104 |
| 2023/0275458 A1* | 8/2023 | Alam | | H02J 7/0044 |
| | | | | 307/104 |
| 2023/0276162 A1* | 8/2023 | Alam | | H02J 50/005 |
| | | | | 381/74 |
| 2023/0292029 A1* | 9/2023 | Alam | | H02J 50/10 |
| | | | | 320/108 |
| 2023/0301408 A1* | 9/2023 | Chawan | | H04R 9/06 |
| 2023/0352974 A1* | 11/2023 | Wang | | H02J 50/80 |
| 2023/0353999 A1* | 11/2023 | Meyer | | H04W 4/80 |
| 2023/0359429 A1* | 11/2023 | van Erven | | G06F 3/165 |
| 2024/0097739 A1* | 3/2024 | Leabman | | H02J 50/80 |
| 2024/0213658 A1* | 6/2024 | Zachara | | H01Q 1/2291 |
| 2024/0305134 A1* | 9/2024 | Peralta | | G01D 7/00 |

(56)                     References Cited

U.S. PATENT DOCUMENTS

2024/0323605  A1 *   9/2024   Born ......................... H04S 7/00
2024/0348962  A1 *  10/2024   Lehnert ................ H02J 7/0044

FOREIGN PATENT DOCUMENTS

EP              3273703  A1 *   1/2018
EP              3367582  A1 *   8/2018   .............. H02J 50/00
EP              3493556  A1 *   6/2019
WO     WO-2010025157  A1 *   3/2010
WO     WO-2010035256  A2 *   4/2010
WO          2018026201  A1     2/2018
WO     WO-2018128577  A2 *   7/2018
WO     WO-2019070175  A1 *   4/2019
WO     WO-2021242973  A1 *  12/2021

OTHER PUBLICATIONS

The World's Smallest 13.56 MHz Wireless Charging LSI "ML7630/
7631"13.56MHz (NFC) Wireless Charging Makes It Possible, https://
www.lapis-tech.com/en/semicon/wpt/landing/ml7630_31.html, © 2008-
20192019 LAPIS Semiconductor Co., Ltd.
E. Strömmer, Novel wireless charging technology utilises existing
NFC antennas and circuits, 2013.
Sony 900MHz Wireless Stereo Noise Reduction Headphones, http://
pricesero.com/900mhz-wireless-headphone-system.html, Nov. 1, 2019.
Business Wire, NFC Forum Specification Allows Wireless Charging
of IoT Devices Using Shared Antenna, https://www.businesswire.
com/news/home/20190115005082/en/NFC-Forum-Specification-
Wireless-Charging-IoT-Devices, Jan. 15, 2019.
J. Wu, Near-Field Magnetic Induction for Wireless Audio and Data
Streaming, https://www.futureelectronics.com/resources/get-connected/
2017-06/future-electronics-near-field-magnetic-induction, 2017.
A. Kumar, Wireless Power is Coming, https://www.pcmag.com/
news/wireless-power-is-coming, Jun. 8, 2018.
Nov. 12, 2021—(WO) International Search Report and Written
Opinion—App PCT/US21/34442.
Sep. 15, 2021—(WO) International Search Report and Written
Opinion—App PCT/US21/34442.

* cited by examiner

WEARABLE DEVICE WITH CONDUCTIVE COIL FOR WIRELESS CHARGING AND COMMUNICATING

CROSS-REFERENCE TO RELATED APPLICATIONS

This application claims the benefit of and priority to U.S. Provisional Patent Application No. 62/704,829, entitled "Wearable Device with Conductive Coil for Wireless Charging and Communicating," filed May 29, 2020, the contents of which are hereby incorporated by reference.

BACKGROUND

Wireless earphones, and other small wearable devices, often have internal batteries that require charging. These wearable devices may be limited in size, according to their use. For example, wireless earphones may need to be small enough to partially fit inside an ear canal of a wearer. While existing wearable devices may facilitate the charging of their internal batteries via external charging connectors or pads, these external connections present problems, as they require the housing of the device to have openings so that these charging connectors or pads can be accessed externally. Therefore, the housing cannot be fully sealed from the environment, and, as a result, these devices may suffer from internal damage caused by moisture or other environmental contamination.

Of course, some larger devices do currently support wireless charging, and these devices can be sealed, thereby protecting their internal circuitry from environmental contamination. However, in order to facilitate wireless charging, these devices require an inductor for charging which is larger than can be fit into small wearable devices.

Furthermore, small wearable devices, such as earphones, are designed to be as small as possible, and the addition of an inductor for charging would require a housing of the device to be enlarged.

SUMMARY

The following summary presents a simplified summary of certain features. The summary is not an extensive overview and is not intended to identify key or critical elements.

According to some aspects, a wearable device, such as an earphone, is disclosed having a conductive coil that may be used in several operational modes, including a first mode for harvesting power to charge an internal battery, a second mode for communicating via near field communications (NFC), and a third mode for communicating via near field magnetic induction (NFMI).

The wearable device may include a controller, configured to adapt or configure the conductive coil for each of the operational modes.

According to further aspects, the conductive coil may be positioned, or wrapped, around a bobbin, which may have a battery positioned within a cavity therein. A diameter of the conductive coil may be between 10 mm and 20 mm, thereby allowing it to fit within a housing of a wireless earphone.

These and other features and potential advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
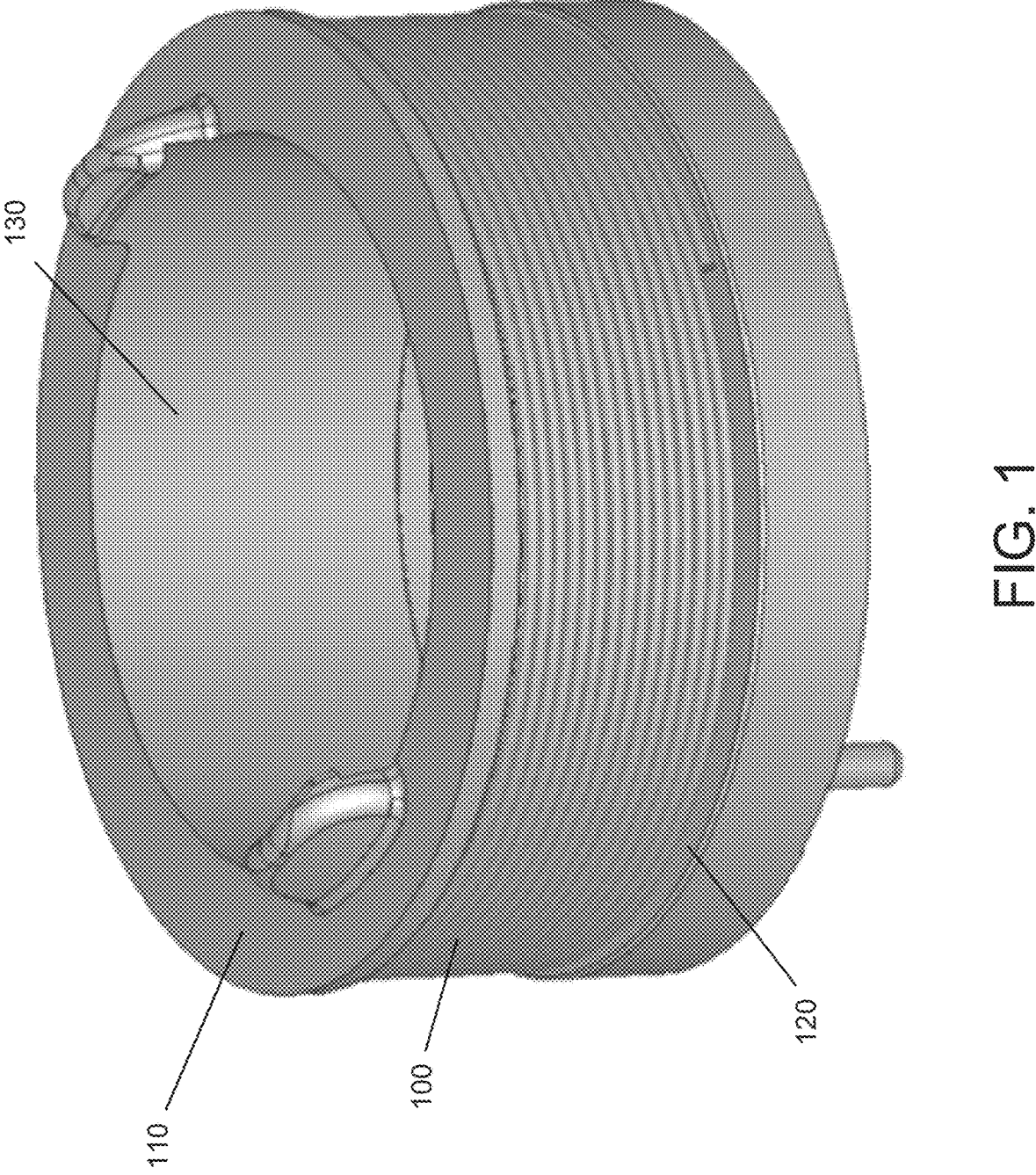
FIG. 1 is a diagram illustrating a conductive coil, according to at least one embodiment.

The accompanying drawings, which form a part hereof, show examples of the disclosure. It is to be understood that the examples shown in the drawings and/or discussed herein are non-exclusive and that there are other examples of how the disclosure may be practiced.

It is desirable that some wearable devices, such as earphones, be kept small in size, in order to facilitate their intended use. Some currently available earphones may include, among other things, an antenna for Bluetooth communication, an inductor for NFMI communication, and charging pads for charging an internal battery. These components are fit into a housing, with the charging pads exposed externally for interfacing with a charger. While it would be desirable to be able to charge the earphones without requiring the charging pads, the housing of the earphones is limited in size due to its intended use, and does not have space for an additional inductor for charging.

Accordingly, aspects of the disclosure are directed to a wearable device, such as an earphone, which uses a conductive coil for multiple purposes, in corresponding operational modes. According to particular embodiments, the operational modes may include a first mode for harvesting power to charge an internal battery, a second mode for communicating via near field communications (NFC), and a third mode for communicating via near field magnetic induction (NFMI). By using the conductive coil for multiple purposes, various features can be realized without the addition of a corresponding antennas/inductors.

FIG. 1 illustrates an example conductive coil 100 in accordance with aspects described herein. When in use, the conductive coil 100 may perform as an inductor, with the inductance at least partially dependent on what is inside the coil, for example, the core of the conductive coil 100 may be air or a ferrite material, among others. In various embodiments, the conductive coil 100 may be formed by any number of wraps of an insulated conductor, such as a wire, thereby forming a coil. In some embodiments, the coil 100 may include between ten and eleven wraps of wire. Each wrap may be circular in form, and the wraps may be positioned as concentric circles or rings. A number of wraps may together form a cylindrical shape, such as a right circular hollow cylinder. In some embodiments, an internal diameter of the coil may be between 10 mm and 20 mm. In certain examples where the conductive coil 100 is formed of wire, the wire may be, 30 AWG (American Wire Gauge) or 31 AWG, in some examples.

Various methods may be used to fix the conductive coil 100, so that it retains its shape. For example, in some embodiments, glue or tape may be used to fix the conductive coil 100. In some embodiments, the conductive coil 100 may be wrapped around a bobbin, such as bobbin 110. The bobbin 110 may be made of various materials, such as plastic, or a ferrite material, and may support the conductive coil, or may be used to fix the conductive coil 100, so that its shape can be retained.

Depending on the implementation, the conductive coil 100 may be made of an insulated conductor wrapped around the bobbin 110 various numbers of times. For example, in some embodiments, the coil may include ten wraps or eleven wraps of an insulated conductor around the bobbin 110. The thickness of the conductor and/or the number of wraps/turns of the conductor may be chosen according to the intended use. For example, these parameters may be selected based on known or expected performance at various wireless charging frequencies and/or various communication frequencies.

In some embodiments, one or more layers of ferrite sheets 120 may be positioned on an inner surface of the conductive coil 100. The ferrite sheets 120 may be made of a ferrite material, such as nickel, zinc, copper, and/or other ferrite materials, and may have a thickness between 0.045 mm and 0.30 mm. The ferrite sheets 120 may be part of a structure which may include various other layers, such as a polyethylene terephthalate (PET) cover tape, an adhesive tape, and/or a PET/paper release liner (which may be removed to expose the adhesive tape). Examples of ferrite sheets 120 include the FLX-170V from Toda Kogyo Corp, and a MULL series flexible ferrite sheet from Laird Technologies, Inc., such as the MULL12060-000.

The ferrite sheets 120 may be selected based on the complex permeability properties exhibited by the ferrite sheets 120. In some embodiments, the ferrite sheets 120 may be selected to have a high permeability and low loss at particular frequencies, such as 10 MHz or 13.56 MHz, among others, in order to maximize charging efficiency at the particular frequency. For example, the ferrite sheets noted above have a real permeability of approximately 150 at 13.56 MHz and an imaginary permeability of approximately 5 or less at the same frequency. In embodiments having a bobbin 110, the ferrite sheets 120 may be positioned between the conductive coil 100 and the bobbin 110, as shown in FIG. 1.

In some aspects, a hollow space in a center of the conductive coil 100 may be used for holding components of a wearable device, including components such as a battery. For example, one or more button cell or "coin cell" batteries may be positioned in the hollow space in the center of the conductive coil 100. In some embodiments, a diameter of the conductive coil 100 may be chosen in order to fit a particular battery in the hollow space formed by the conductive coil 100. In some other embodiments, a battery may be chosen in order to fit in the hollow space formed by the conductive coil 100. In embodiments having a bobbin, the bobbin 110 may have a cavity 130, in which parts or components of the wearable device may be positioned. For example, one or more batteries may be positioned in the cavity 130.

In some embodiments, the conductive coil 100 may be formed, for example, during manufacturing, by wrapping a wire around a battery, thereby encircling the battery. For example, an insulated conductor may be wrapped around a cylindrical battery to form the conductive coil 100. In some embodiments, one or more ferrite sheets 120, or other conductive or non-conductive layers may be positioned between the conductive coil 100 and the battery, for example, before wrapping the battery with the wire.

Figure 2:
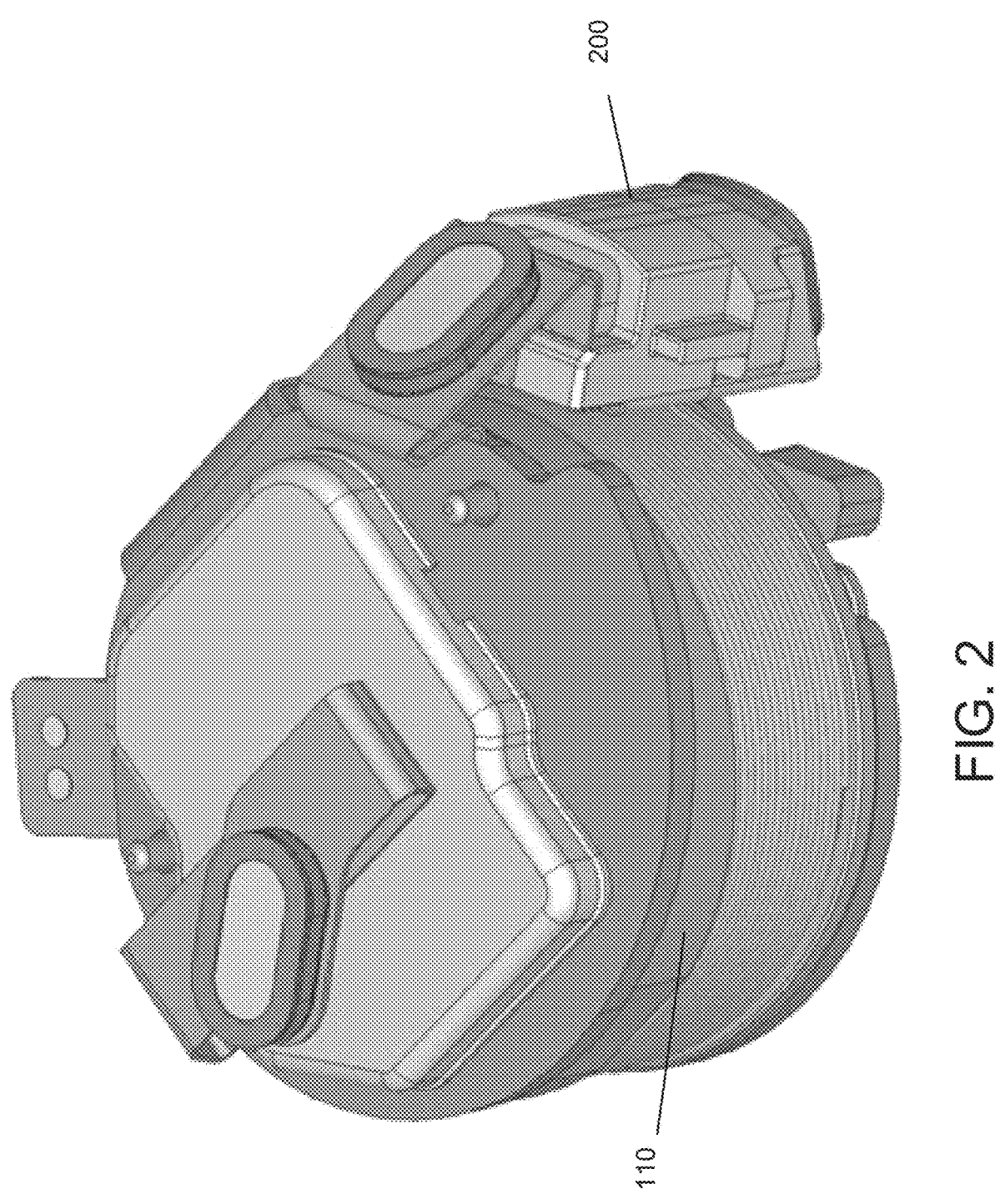
FIG. 2 is a diagram illustrating an arrangement of the conductive coil, configured for use in an earphone, in accordance with aspects described herein.

FIG. 2 shows an arrangement of the conductive coil and bobbin of FIG. 1, configured for use in an earphone. Also shown in FIG. 2 are various other components as may be found in an earphone, such as a sound transducer 200 for producing an audio output. While FIG. 2 depicts some exemplary components, an earphone may have additional components, or fewer components, depending on the embodiment.

As will be understood by those skilled in the art, it is important for an earphone to be small in size, so that it can be fit to a wearer's ear canal. In the arrangement depicted in FIG. 2, a battery (not shown) for powering the earphone may be positioned inside the bobbin 110, in cavity 130 (shown in FIG. 1).

Figure 3:
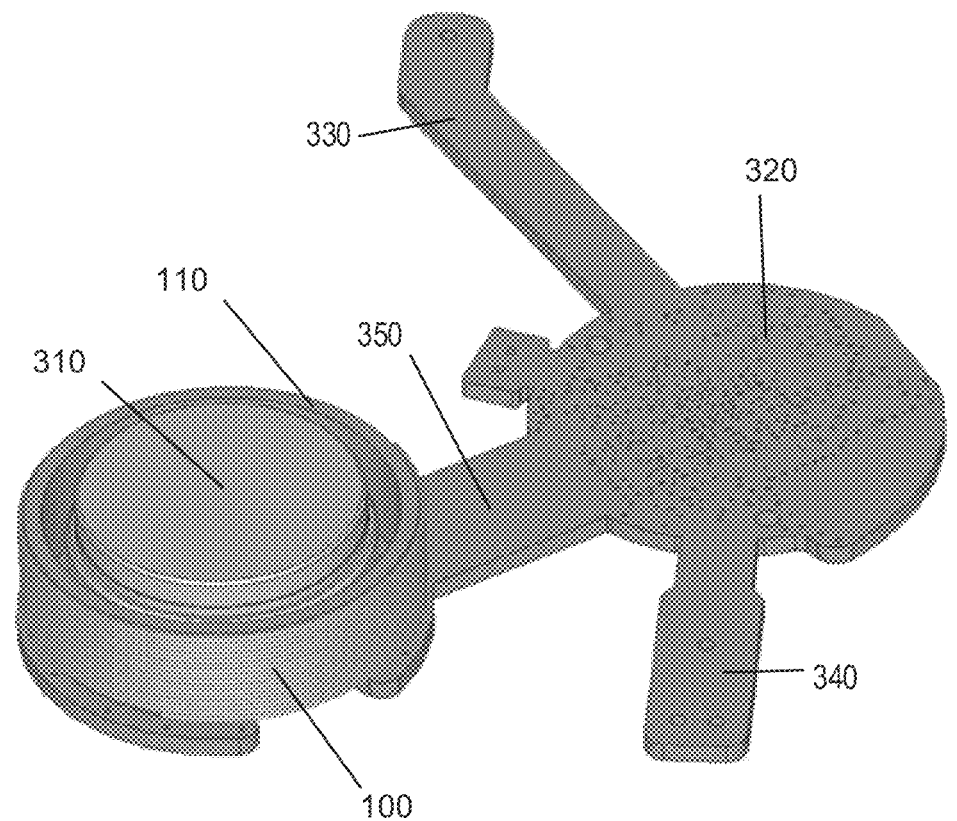
FIG. 3 depicts a view of an earphone during an intermediate step of assembly, according to at least one embodiment.

FIG. 3 shows a view of the earphone of FIG. 2 depicted during an intermediate step of assembly, wherein the bobbin 110 and conductive coil 100 can be seen positioned on arm 350 of a structure, which may also include arms 330 and 340, prior to final assembly. A battery 310 can be seen positioned inside the bobbin 110, as described above. Also shown in FIG. 3 is a printed circuit board assembly (PCBA) 320, which may contain various electronic circuitry for communications, sound amplification, and battery charging, among others. Arms 330, 340, and 350 may be configured to wrap or fold around the bobbin 110. As can be seen in FIG. 3, the PCBA 320 may include holes which are configured to receive pins which may be present in the bobbin 110, for example, after arm 350 has been folded to allow the PCBA 320 to be positioned on top of the bobbin 110.

Figure 4:
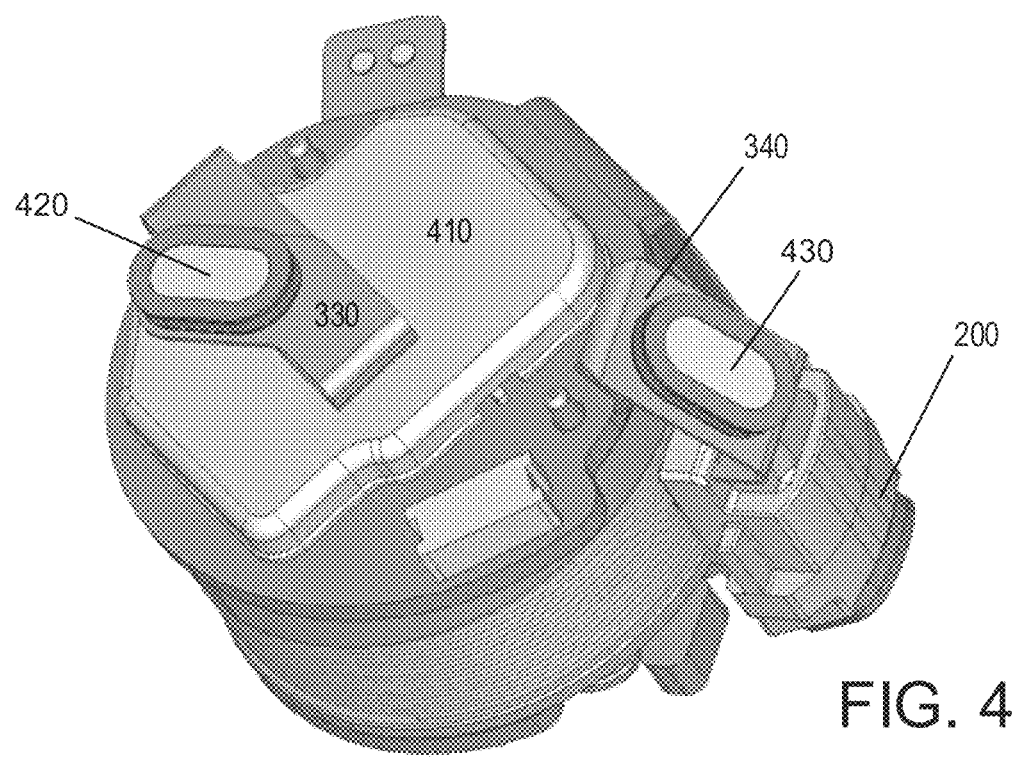
FIG. 4 shows a view of an earphone, according to at least one embodiment.

FIG. 4 shows a view of the earphone of FIG. 2 after the structure has been wrapped or folded around the bobbin 110. In some embodiments, a shield 410 may be used to provide shielding and protect components underneath. Microphones, such as MEMS microphones 420 and 430, may be positioned to capture audio. As can be seen in FIG. 4, MEMS microphone 420 may be positioned on arm 330, and MEMS microphone 430 may be positioned on arm 340. In some embodiments, MEMS microphones 420 and 430 may capture the voice of the wearer, for example, when the wearer is speaking during a phone call or when the wearer is providing voice commands to interact with an audio source, such as a music player. The MEMS microphones 420 and 430 may be used in beam forming to better capture the wearer's voice. In addition, the MEMS microphones 420 and 430 may capture external noise, such as wind noise or interfering speech, and the signal from the MEMS microphones 420 and 430 may be used in noise suppression processing.

Figure 5:
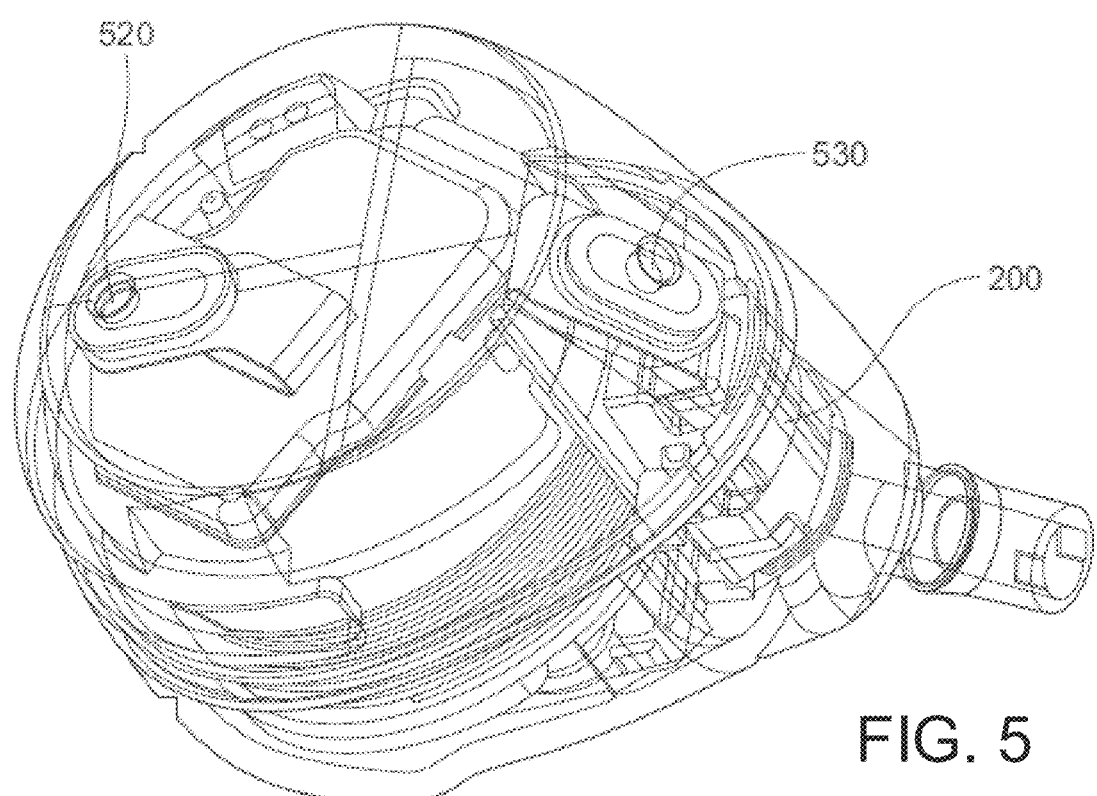
FIG. 5 depicts another view of an earphone, in accordance with aspects described herein.

FIG. 5 shows a view of the earphone of FIG. 2 depicted inside a housing. As can be seen, the shape of the housing may be designed to conform to protect the components inside the housing while keeping the size of the housing to a minimum, so that the overall earphone is small enough to be worn by a wearer. Openings in the housing, such as openings 520 and 530, may be provided to expose the MEMS microphones 420 and 430.

Figure 6:
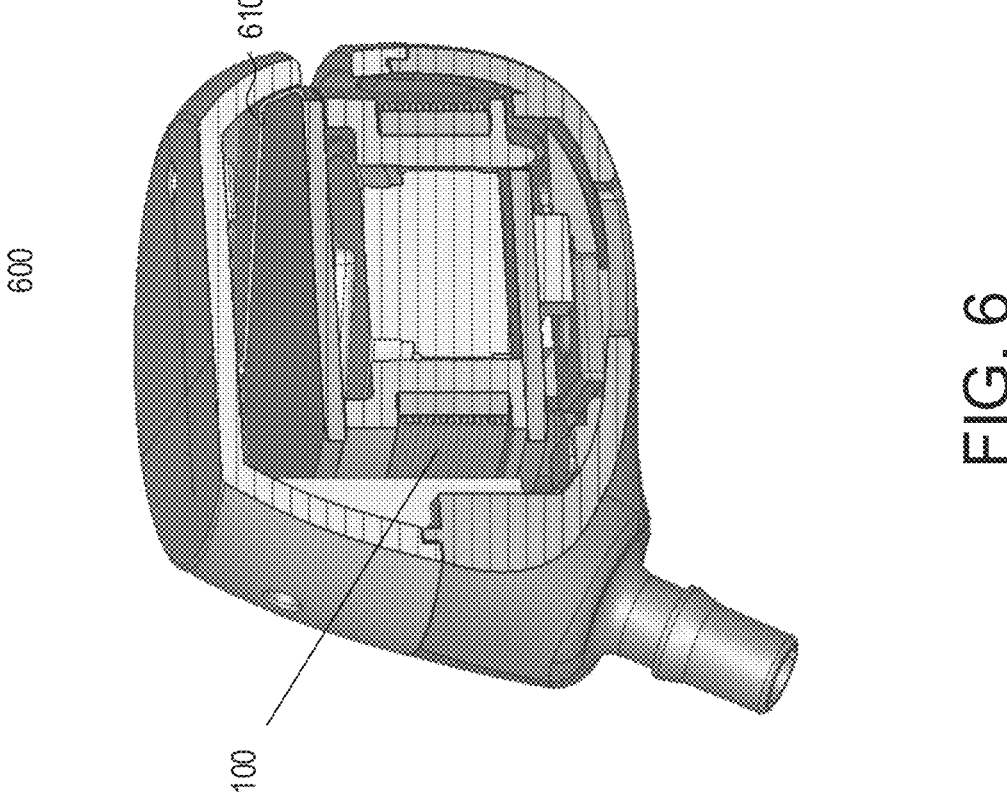
FIG. 6 is a diagram illustrating an example of an arrangement of a Bluetooth antenna and the conductive coil within an earphone, according to at least one embodiment.

FIG. 6 is an illustration showing an example internal arrangement of a Bluetooth antenna 610 and the conductive coil 100 within an earphone 600, in accordance with aspects described herein. In some embodiments, as shown in FIG. 6, the antenna 610 may be provided for communicating via Bluetooth, such as via the Bluetooth Low Energy standard (also known as Bluetooth LE or BLE). While a laser direct structuring (LDS) planar inverted-F antenna (PIFA) is shown as the antenna 610 in the illustration of FIG. 6, it should be understood that, in various other embodiments, the antenna 610 may comprise an LDS antenna of a different type, a printed circuit board (PCB) antenna, a formed wire antenna, a chip antenna, or a stamped metal antenna. Antenna 610 may be positioned outside of the conductive coil 100, and may be positioned opposite to a sound transducer. For example, the antenna 610 may be positioned so that it is relatively far from the ear of a wearer, when worn. In some embodiments, a plane of the antenna 610 may be roughly parallel to a wrap of a conductor of the conductive coil 100. The earphone 600 may, in some embodiments, include a stem and an attached ear loop (not depicted), for holding the earphone 600 to a wearer's ear.

Figures 7, 8:
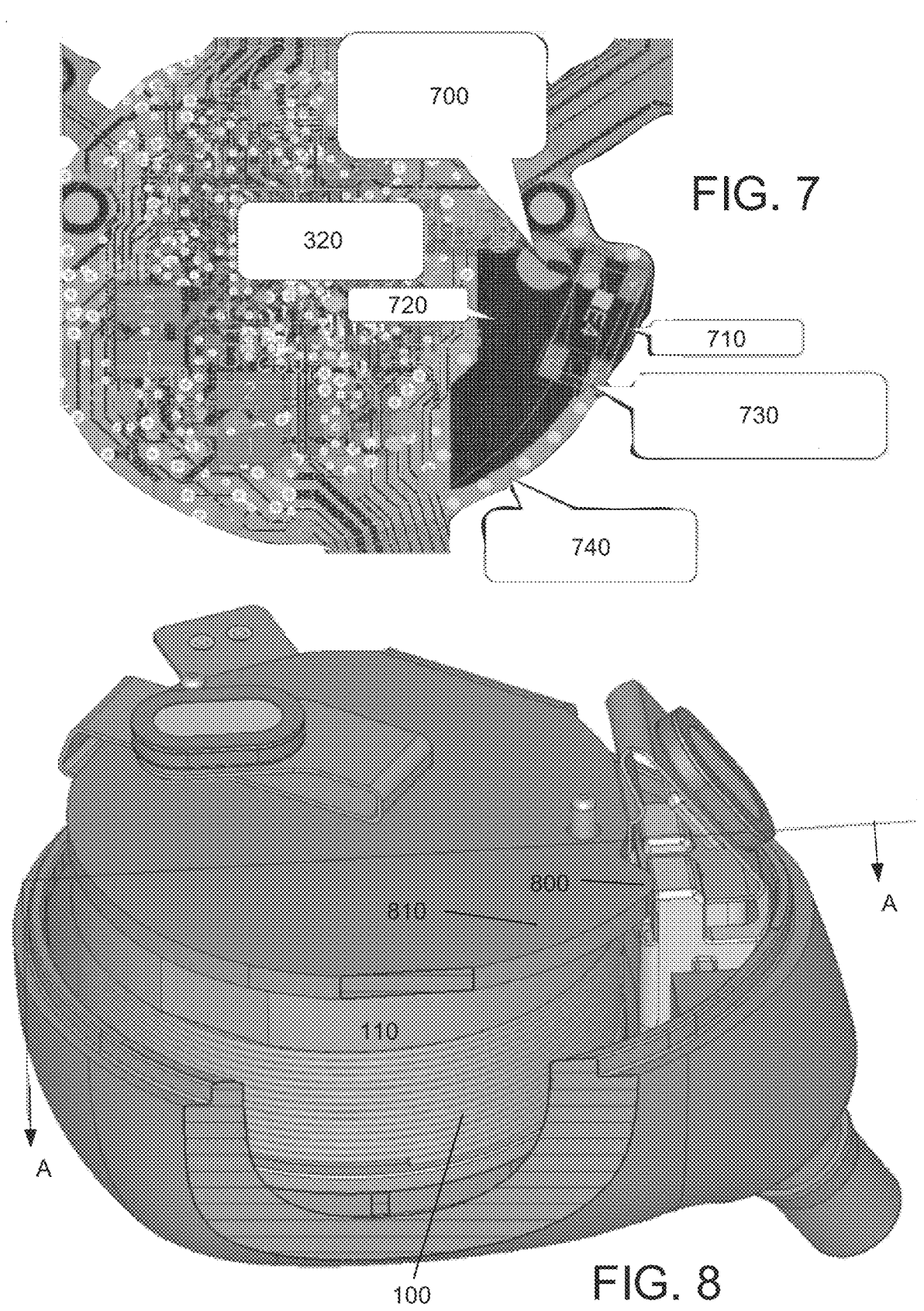
FIG. 7 shows a view of a Bluetooth antenna, according to at least one embodiment.
FIG. 8 shows a cutaway view of an earphone incorporating the embodiment depicted in FIG. 7.

FIGS. 7-8 show views of an embodiment wherein the antenna 610 is a chip antenna 710, such as a 2.45 GHz SMD (surface mount device) antenna, from Johanson Technology, Inc. In this embodiment, a ground loop 720 may be provided on the PCBA 320, and may include ground trace 740. In some embodiments with the above-mentioned chip antenna 710, pads 2 and 3 (see 730) of the chip antenna 710 may be connected with an internal trace to maximize ground loop area. In addition, as can be seen in cutaway view FIG. 8, the PCBA 320 may include a small overhang 800 on which the chip antenna can be mounted, so that the chip antenna 710 is not directly over the battery 310, conductive coil 100, or other metallic components. A test pad 700 is shown in FIG. 7. This test pad 700 may be used in testing antenna performance in a production environment. In FIG. 8, the ground loop 720 is positioned on the underside of the surface at the position identified by the label 810.

Figure 9:
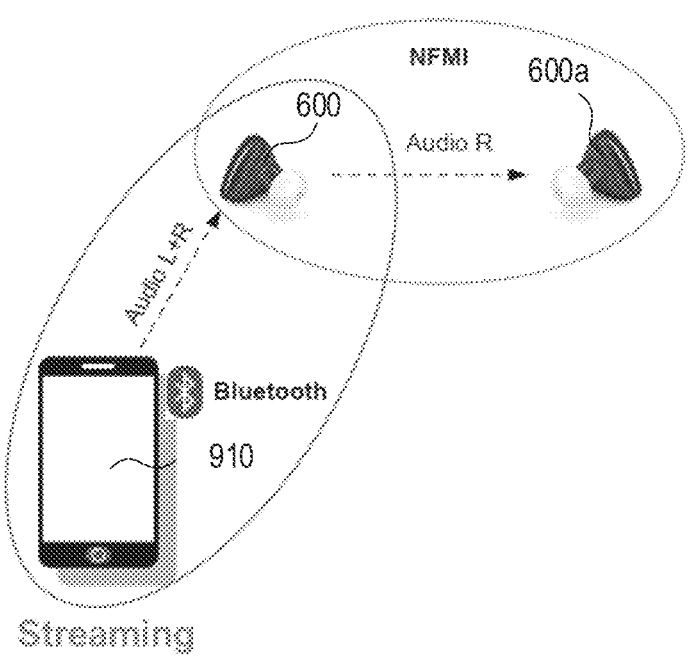
FIG. 9 is a diagram illustrating an example communications interconnection of an earphone with the conductive coil in direct communications with other devices, in accordance with aspects described herein.

FIG. 9 shows an example communications interconnection of an earphone having the conductive coil 100, such as the earphone 600 shown in FIG. 6, in direct communications with other devices, in accordance with aspects described herein.

In an aspect of operation, antenna 610 of earphone 600 may receive an audio signal via Bluetooth communications with a mobile phone 910, or other audio providing device. The audio signal may be decoded by circuitry of the earphone and output as sound waves via sound transducer 200. In addition, the earphone may, via conductive coil 100, use NFMI communications to send the audio to one or more additional devices, such as a second earphone 600a, which in turn may use its sound transducer to output sound waves. In order to receive the audio via NFMI communications, earphone 600a may also be provided with the conductive coil 100 as described herein. Accordingly, a wearer may be provided with audio in each ear for listening. In some embodiments, the NFMI communications may use a carrier frequency of 10.6 MHz. In some other embodiments, the NFMI communications may use a carrier frequency between 13 MHz and 14MHz, such as a carrier frequency of 13.56 MHz. It is contemplated that the NFMI communications may alternatively use other carrier frequencies, in accordance with the teachings herein.

In some embodiments, earphone 600 may use NFMI communications to send audio captured by MEMS microphones 420 and 430 to earphone 600a (or vice versa). Earphone 600 may use the audio received from earphone 600a in beamforming or noise canceling processes.

In some embodiments, the earphone 600 may configure the conductive coil 100 as an NFC antenna and use NFC communications to communicate with another device, such as mobile phone 910, in order to perform Bluetooth pairing. For example, in some embodiments, the earphone 600 and the mobile phone 910 may support NFC tap-to-pair functionality. In these embodiments, and with the mobile phone 910 in Bluetooth pairing mode, the earphone 600 may be tapped to the mobile phone 910 by the user, and a Bluetooth connection may be established.

In order to use the conductive coil 100 for NFC communications, the conductive coil 100 may be switched between operational modes for communicating via NFMI and for communicating via NFC. In some embodiments, the earphone may configure the conductive coil 100 for NFC communications responsive to a user input, such as a button press. In these embodiments, the earphone may keep the conductive coil 100 in NFC communication mode for a period of time and then return the conductive coil 100 to NFMI communications mode. In some other embodiments, the earphone may return the conductive coil 100 to NFMI communications mode when a function has been completed, for example, when the earphone has completed pairing with the mobile phone 910.

Figure 10:
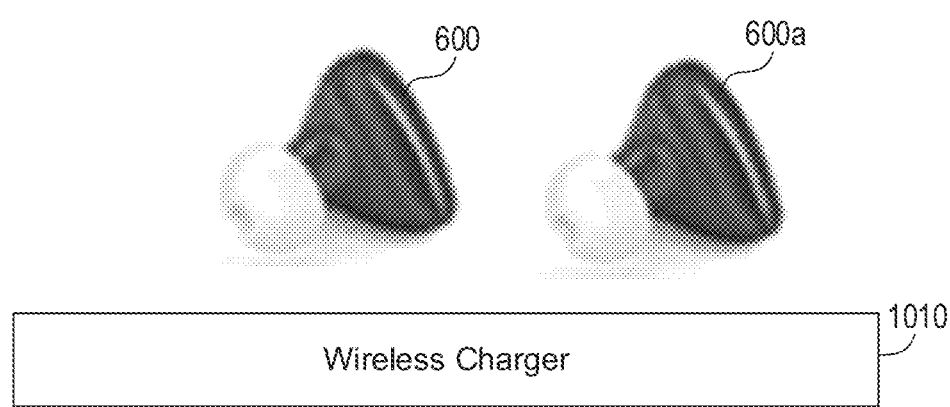
FIG. 10 shows earphones positioned on a charging pad for wireless charging, in accordance with aspects described herein.

FIG. 10 shows earphones 600 and 600a, each having the conductive coil 100 as described above, positioned on a charging pad of wireless charger 1010 for wireless charging, in accordance with aspects described herein. In some embodiments, the earphones 600 and 600a may each configure corresponding conductive coil 100 to receive energy for wireless charging of their internal batteries. For example, earphone 600 may configure its conductive coil 100 to receive wireless power at 13.56 MHZ, and supply received energy to an internal battery, such as battery 310 of FIG. 3.

In some embodiments, prior to configuring their conductive coils 100 for charging, the earphones 600 and 600a may each configure their corresponding conductive coil 100 to communicate via NFC with a wireless charger 1010. For example, the earphone 600 may communicate via NFC to identify itself to the wireless charger 1010, or to detect the presence of, or to obtain the identity of, the wireless charger 1010. As discussed above, the earphone 600 may initiate NFC communications mode responsive to user input. In some embodiments, the earphones 600 and 600a may use NFC communications during charging. For example, the earphone 600 or the wireless charger 1010 may communicate via NFC communications to manage the charging process. In these embodiments, the earphone 600 may cycle the conductive coil 100 through communication and charging modes. For example, during a communication mode, the earphone 600 may communicate with the wireless charger 1010 to manage the charging process, and then the earphone 600 may enter charging mode to continue charging the battery. The NFC communications may use a carrier frequency of 13.56 MHz.

In some embodiments, the earphone 600 and the wireless charger 1010 may support NFC tap-to-pair functionality, as discussed above. In these embodiments, and with the wireless charger 1010 in Bluetooth pairing mode, the earphone 600 may be placed onto the wireless charger 1010 by the user, and a Bluetooth connection may be automatically established and used for controlling the charging process.

Figure 11:
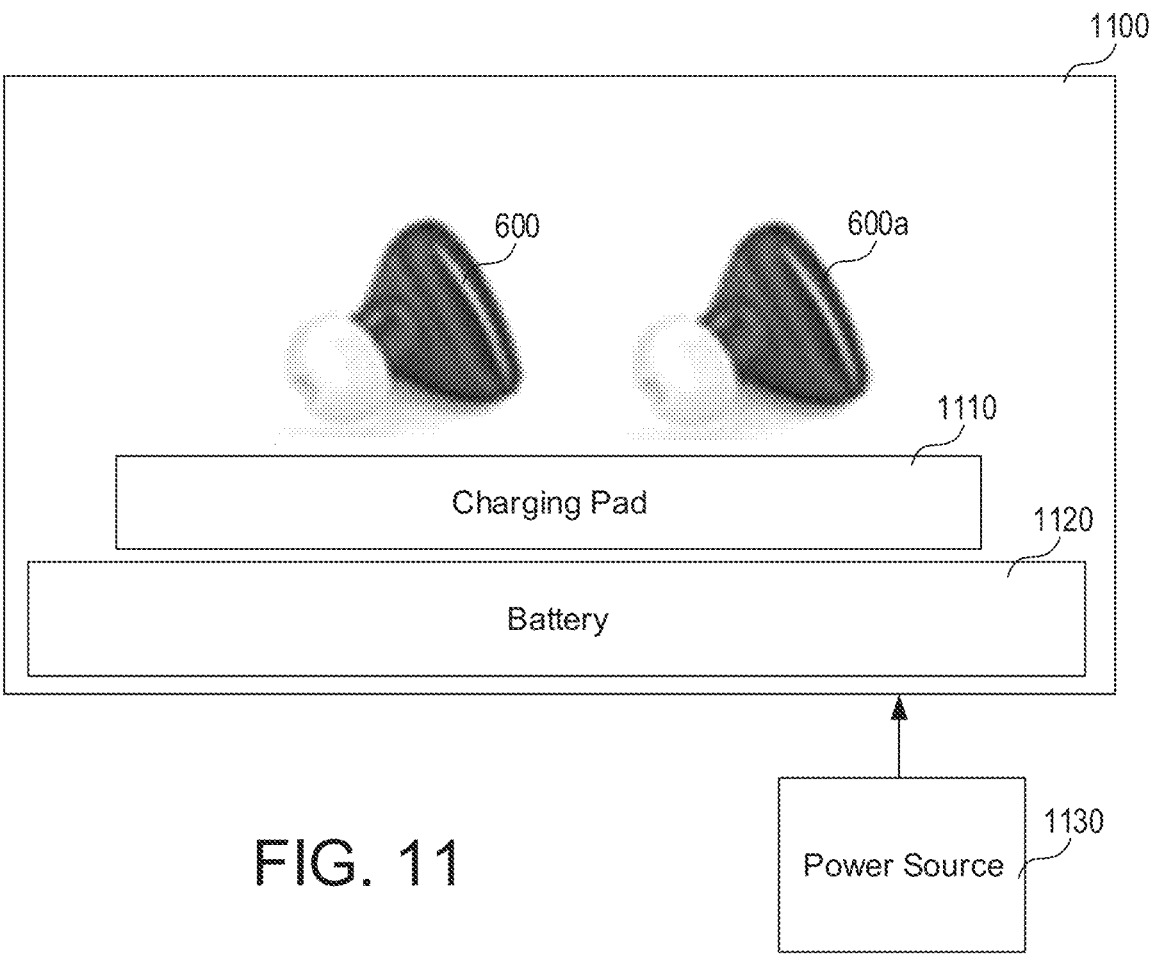
FIG. 11 depicts earphones in a case for wireless charging, in accordance with aspects described herein.

FIG. 11 shows earphones 600 and 600a in a case 1100, positioned for wireless charging, in accordance with aspects described herein. In some embodiments, case 1100 may be a storage case or a carrying case, provisioned for wirelessly charging the earphones 600 and 600a when they are positioned in the case. In some embodiments, the case may include a battery 1120 which may power wireless charging circuitry within the case. The circuitry may include, or be connected to, a wireless charging pad 1110. The battery 1120 enables the case to be portable, such that the earphones 600 and 600a may be charged "on the go."

In some embodiments, the battery 1120 may itself be charged via wireless charging, for example, when in proximity to an external charging pad. In various embodiments, the case may be configured with circuitry allowing the battery 1120 to charge, while at the same time providing power to wirelessly charge earphones 600 which may be inside the case. In some embodiments, the battery 1120 may be charged using a different wireless power frequency or standard than the methods discussed above. For example, battery 1120 may be charged at 900 MHz.

In some other embodiments, the battery 1120 may be charged via a wired connection to an external power source 1130, such as via a wall power socket.

The case 1100 may communicate with the earphones 600 and 600a in order to identify the earphones 600 or to initiate, halt, monitor, and/or control charging of the earphones. In some embodiments, communication may take place using NFC or Bluetooth, among others.

In various embodiments, the case 1100 may be configured for charging the earphones 600 and 600a using various wireless charging frequencies or standards. It is contemplated that other wearable devices may be charged in case 1100, in various configurations.

In some embodiments, the case 1100 may have cavities configured to hold a portion of each of the earphones 600, in order to keep them in a position for efficient charging. For example, with the conductive coil 100 positioned close to the sound transducer 200, charging efficiency may be optimized when the earphone 600 is positioned in the case with the sound transducer 200 pointed roughly toward the charging surface. Therefore, the case 1100 may have a cavity configured to fit the sound transducer 200 so that, when placed in the cavity, the conductive coil 100 of the earphone will be positioned close to a charging coil of the case 1100.

Figure 12:
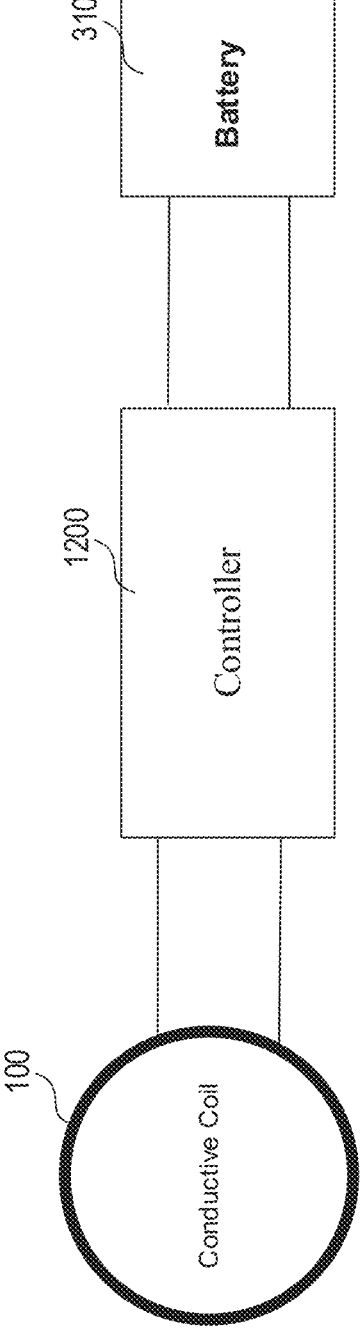
FIG. 12 is a block diagram illustrating a circuit for controlling a wearable device for communicating and for charging using a same conductive coil, in accordance with aspects described herein.

FIG. 12 is a block diagram illustrating a controller 1200 for controlling a wearable device for communicating and for charging a battery 310 using conductive coil 100, in accordance with aspects described herein. As can be seen from FIG. 12, the ends of the conductive coil 100 are connected to the controller 1200. The controller 1200 may configure the conductive coil 100 for use in a first mode for harvesting power to charge the battery 310, a second mode for communicating via NFC, and a third mode for communicating via NFMI.

In various embodiments, the controller 1200 may include a switching network or a passive diplexer which may be used for configuring the conductive coil 100 for operating in the operating modes discussed above. The controller 1200 may also include circuitry configured to send an audio signal to the sound transducer 200, based on a signal received via the antenna 610.

Figure 13:
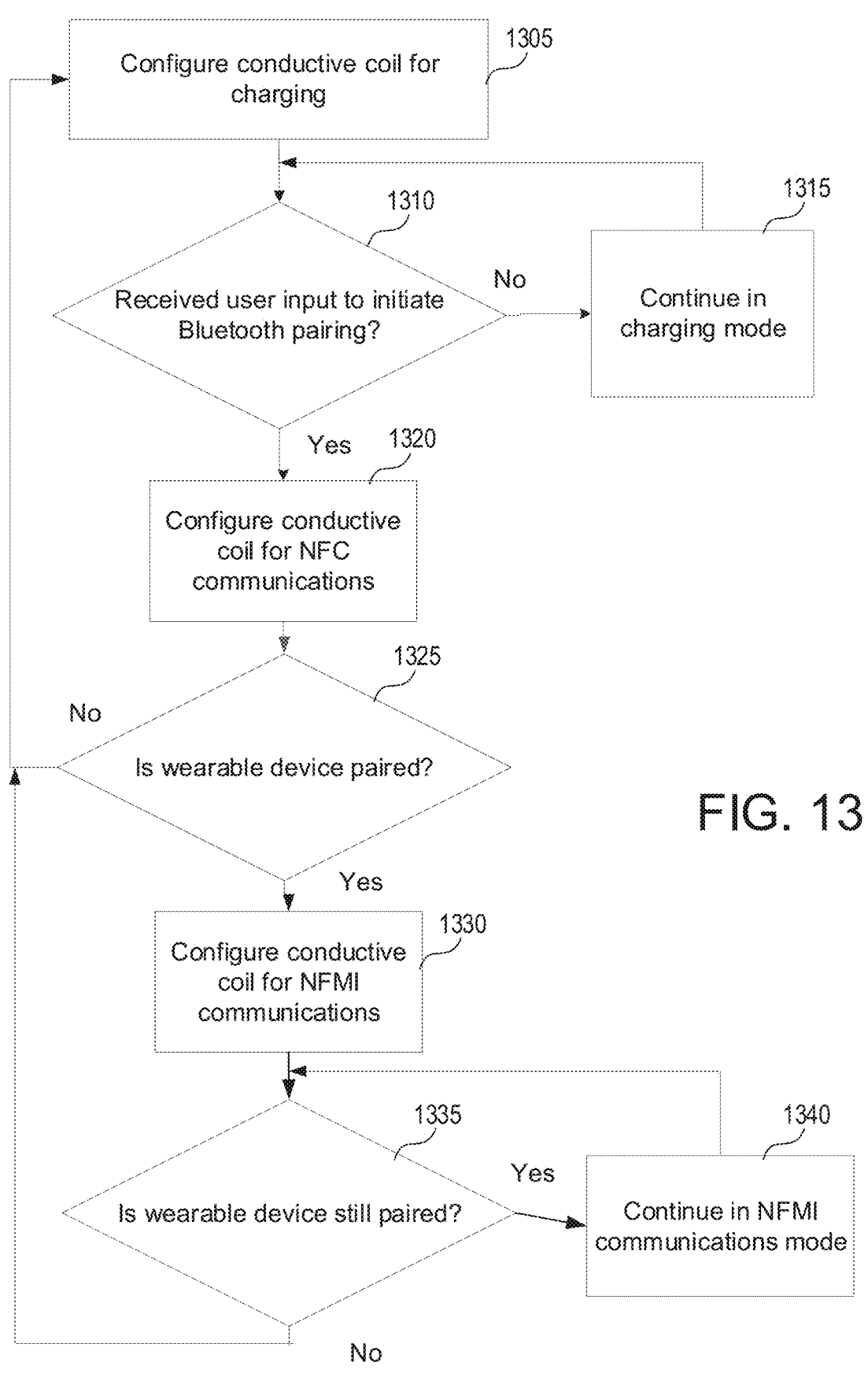
FIG. 13 depicts a process for controlling a wearable device for communicating and for charging using a same conductive coil, according to at least one embodiment.

FIG. 13 shows a process performed by the wearable device for configuring the conductive coil 100 for use in a first mode for harvesting power to charge a battery, a second mode for communicating via NFC, and a third mode for communicating via NFMI, in accordance with aspects described herein.

At step 1305, the conductive coil of the wearable device is configured for charging. In some embodiments, this may be considered the default mode, and may be the configuration of the conductive coil 100 when the wearable device is powered off or after being powered on. In this mode, the conductive coil is configured to receive a wireless signal having a frequency between 0.1 MHz and 30 MHz.

At step 1310, the wearable device may determine whether a user input has been received. For example, the user input may be the result of an action by the user to initiate Bluetooth pairing. If at step 1310 it is determined that a user input has not been received, the wearable device may, at step 1315, continue in charging mode for a period of time and then return to step 1310 to check again for user input.

If at step 1310 it is determined that a user input has been received, the wearable device may, at step 1320, exit charging mode and configure the conductive coil 100 for NFC communications. The wearable device may then pair with an audio providing device, such mobile phone 910. For example, the wearable device may use Bluetooth communications, via antenna 610, to pair with the mobile phone 910, as discussed above.

At step 1325, the wearable device may determine whether or not it is paired to another device, such as an audio producing device. If at step 1325 it is determined that the wearable device is not paired with another device, the process may return to step 1305, where the wearable device may configure the conductive coil 100 for charging.

If at step 1325, it is determined that the wearable device is paired, then the wearable device may, at step 1330, configure the conductive coil 100 for NFMI communications. For example, after the user has initiated pairing, the wearable device may prepare for use wherein a signal based on audio received via Bluetooth may be transmitted to another wearable device using NFMI communications. For example, a first earphone (e.g. earphone 600) may receive audio over Bluetooth and then send, to a second earphone (e.g. earphone 600a), and via NFMI communications, a signal based on the received audio. This allows a wearer to have audio in both ears for improved listening.

The process may continue to step 1335, wherein the wearable device may check to see that it is still paired with another device, and if so, may continue operating in NFMI communications mode at step 1340 and then return to step 1335 to check again to verify that the wearable device is still paired.

If at step 1335, it is determined that the wearable device is not paired, the process may return to step 1305, where the wearable device may configure the conductive coil 100 for charging.

Figure 14:
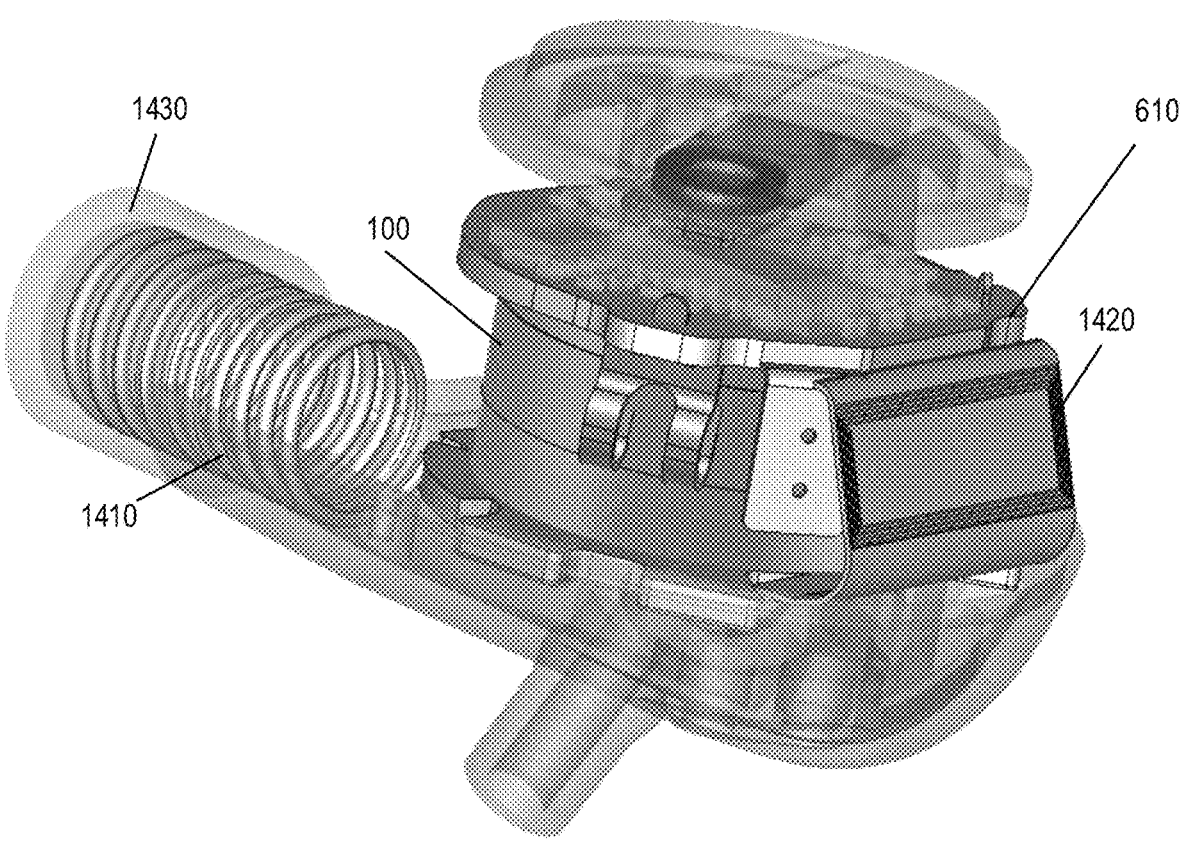
FIG. 14 is a diagram illustrating an example of an arrangement of a 900 MHz antenna within an earphone, according to at least one embodiment.

In some embodiments, the wearable device may include an inductor 1410 configured for 900 MHz wireless charging, instead of the conductive coil 100. In embodiments comprising an earphone, the inductor 1410 may be positioned in, or extend into, a space adjacent to an ear hook, which may be provided to keep the earphone in a position on a wearer's ear. For example, as shown in FIG. 14, at least a portion of the inductor 1410 may be positioned in stem 1430. In other embodiments, the inductor 1410 may be positioned in an ear hook (not shown) or in another component.

Depending on the embodiment, the inductor 1410 may have various geometries, including spiral shapes, helical shapes, strips, or meandering metallic forms, among others. The wearable device may also include an NFC antenna 1420 and/or a Bluetooth antenna 610 for communications, as described above. The wearable device with the inductor 1410 may be charged using 900 MHz wireless charging, via a charging pad or via a case configured for charging, as discussed above. For example, the case 1100, discussed above, may have cavities configured to accept the stem of each of the earphones, in order to keep the inductor 1410 in position for efficient charging.

In some other embodiments, the wearable device may include the inductor 1410 configured for 900 MHz wireless charging, in addition to the conductive coil 100. In some embodiments, the conductive coil may be used for NFC and NFMI communications, while the inductor 1410 may be used for charging of the battery at 900 MHz. In some other embodiments where the wearable device includes both the coil 100 and the inductor 1410, either the coil 100 or inductor 1410 may be used for charging, depending on various factors, including user input, communications received via NFC or Bluetooth, or a factory selected configuration.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A wireless earphone comprising:
a conductive coil;
an inductor positioned in an ear hook and adjacent to the conductive coil;
a battery;
a controller configured to adapt the inductor for communicating via Bluetooth communication, adapt the conductive coil for communicating via one or more of near field communications (NFC) and near field magnetic induction (NFMI), and operate in a plurality of operational modes, wherein the plurality of operational modes comprises at least:
a first mode in which the controller is configured to adapt the conductive coil for wirelessly harvesting power for charging the battery,
a second mode in which the controller is configured to adapt the conductive coil for communicating via NFC,
a third mode in which the controller is configured to adapt conductive coil for communicating via NFMI, and
a fourth mode in which the controller is configured to:
adapt the inductor for wirelessly charging the battery, and
adapt the conductive coil for communicating via one or more of NFC and NFMI; and
a sound transducer positioned opposite the inductor in relation to the conductive coil, wherein the sound transducer is configured to provide an audio output based on an audio signal received from the conductive coil.

2. The wireless earphone of claim 1, wherein the conductive coil encircles the battery.

3. The wireless earphone of claim 1, further comprising a bobbin and at least one ferrite sheet, wherein the conductive coil is wrapped around the bobbin with the at least one ferrite sheet positioned between the bobbin and the conductive coil.

4. The wireless earphone of claim 1, wherein the controller comprises at least one of a switching network or a passive diplexer.

5. A wireless earphone system comprising:
a first device configured to receive near field magnetic induction (NFMI) communications;
a first wireless earphone comprising:
a conductive coil;
an inductor positioned in an ear hook and adjacent to the conductive coil;
a battery;
a controller configured to adapt the inductor for communicating via Bluetooth communication, adapt the conductive coil for communicating via one or more of near field communications (NFC) and near field magnetic induction (NFMI), and operate in a plurality of operational modes, wherein the plurality of operational modes comprises at least:
a first mode in which the controller is configured to adapt the conductive coil for wirelessly harvesting power for charging the battery,
a second mode in which the controller is configured to adapt the conductive coil for communicating via NFC,
a third mode in which the controller is configured to adapt conductive coil for communicating via NFMI, and
a fourth mode in which the controller is configured to:
adapt the inductor for wirelessly charging the battery,
and adapt the conductive coil for communicating via one or more of NFC and NFMI to the first device; and
a sound transducer positioned opposite the inductor in relation to the conductive coil, wherein the sound transducer is configured to provide an audio output based on an audio signal received from the conductive coil.

6. The wireless earphone system of claim 5, wherein the conductive coil encircles the battery.

7. The wireless earphone system of claim 5, wherein the controller comprises at least one of a switching network or a passive diplexer.

8. The wireless earphone system of claim 5, wherein the first device comprises a second wireless earphone.

9. The wireless earphone system of claim 5, further comprising a bobbin, wherein the conductive coil is wrapped around the bobbin.

10. The wireless earphone system of claim 9, further comprising at least one ferrite sheet positioned between the bobbin and the conductive coil.

11. A method for operating a wireless earphone, wherein the method comprises:

alternating between a plurality of operational modes by a controller that is configured to:

adapt an inductor, positioned in an ear hook and adjacent to a conductive coil, for communicating via Bluetooth communication, and adapt the conductive coil for communicating via one or more of near field communications (NFC) and near field magnetic induction (NFMI), wherein the plurality of operational modes comprises at least:

a first mode in which the controller is configured to adapt a conductive coil for wirelessly harvesting power for charging a battery, a second mode in which the controller is configured to adapt the conductive coil for communicating via NFC, a third mode in which the controller is configured to adapt the conductive coil for communicating via NFMI, and a fourth mode in which the controller is configured to adapt an inductor for wirelessly charging the battery, wherein the fourth mode further comprises the controller being configured to adapt the conductive coil for communicating via one or more of NFC and NFMI; and providing, by a sound transducer located opposite the inductor in relation to the conductive coil, an audio output that is based on an audio signal received from at least one of the conductive coil.

12. The method for operating a wireless earphone of claim 11, wherein the conductive coil encircles the battery.

13. The method for operating a wireless earphone of claim 11, wherein the conductive coil is wrapped around a bobbin.

14. The method for operating a wireless earphone of claim 11, at least one ferrite sheet positioned between the bobbin and the conductive coil.

15. The method for operating a wireless earphone of claim 11, wherein the alternating between the plurality of operational modes by the controller comprises adapting at least one of a switching network or a passive diplexer.

16. The method for operating a wireless earphone of claim 11, wherein in the first mode further comprises adapting, by the controller, the conductive coil to receive a wireless signal having a frequency between 0.1 MHz and 30 MHz.

* * * * *